US010181595B2

(12) United States Patent
Cain et al.

(10) Patent No.: US 10,181,595 B2
(45) Date of Patent: Jan. 15, 2019

(54) BATTERY PARTS HAVING RETAINING AND SEALING FEATURES AND ASSOCIATED METHODS OF MANUFACTURE AND USE

(71) Applicant: Water Gremlin Company, White Bear Township, MN (US)

(72) Inventors: Tracy L. Cain, Forest Lake, MN (US); Michael Garin, Mahtomedi, MN (US)

(73) Assignee: Water Gremlin Company, White Bear Township, MN (US)

( * ) Notice: Subject to any disclaimer, the term of this patent is extended or adjusted under 35 U.S.C. 154(b) by 0 days.

(21) Appl. No.: 15/673,308

(22) Filed: Aug. 9, 2017

(65) Prior Publication Data

US 2018/0090740 A1 Mar. 29, 2018

Related U.S. Application Data

(62) Division of application No. 13/539,159, filed on Jun. 29, 2012, now Pat. No. 9,748,551.
(Continued)

(51) Int. Cl.
*H01M 2/30* (2006.01)
(52) U.S. Cl.
CPC .......... *H01M 2/305* (2013.01); *Y10T 29/4911* (2015.01); *Y10T 29/49108* (2015.01)
(58) Field of Classification Search
CPC .............. H01M 2/305; Y10T 29/49108; Y10T 29/4911
See application file for complete search history.

(56) References Cited

U.S. PATENT DOCUMENTS 1,248,768 A 12/1917 Willard
1,326,936 A 1/1920 Jeans et al.
(Continued)

FOREIGN PATENT DOCUMENTS

CA 645083 7/1962
CA 2103759 3/1994
(Continued)

OTHER PUBLICATIONS

Final Office Action; U.S. Appl. No. 13/539,159; dated Dec. 13, 2013; 25 pages.
(Continued)

*Primary Examiner* — Sarah A. Slifka
*Assistant Examiner* — Lilia Nedialkova
(74) *Attorney, Agent, or Firm* — Perkins Coie LLP (57) ABSTRACT

Battery parts, such as battery terminals, and associated systems and methods for making the same are disclosed herein. In one embodiment, a battery part has a base portion that includes one or more undercut sealing portions, each having a root and a lip. The lip can flare outwardly from the root to define an undercut between the root and the lip of the sealing portion. In some embodiments, the battery terminal can include adjacent sealing portions having opposing undercuts defined by overlapping lips of the adjacent sealing portions. Another embodiment includes a forming assembly for use with, for example, a battery part having a bifurcated acid ring with spaced apart lips. The forming assembly can include movable forming members that can be driven together to peen, crimp, flare or otherwise form the lips on the bifurcated acid ring.

19 Claims, 3 Drawing Sheets

Related U.S. Application Data (60) Provisional application No. 61/502,641, filed on Jun. 29, 2011.

(56) References Cited

U.S. PATENT DOCUMENTS

| | | |
|---|---|---|
| 1,411,414 A | 4/1922 | Cook |
| 1,947,158 A | 2/1934 | Henry |
| 1,982,801 A | 12/1934 | Gerking |
| 1,983,618 A | 12/1934 | Lamond |
| 2,100,333 A | 11/1937 | Hess |
| 2,194,092 A | 3/1940 | Lund et al. |
| 2,500,556 A | 3/1950 | Mallach |
| 2,510,100 A | 6/1950 | Goss |
| 2,599,706 A | 6/1952 | Friedman |
| 2,678,960 A | 5/1954 | Jensen |
| 2,901,527 A | 8/1959 | Mocas |
| 3,096,579 A | 7/1963 | Waller |
| 3,101,534 A | 8/1963 | Lange |
| 3,113,892 A | 12/1963 | Albrecht |
| 3,186,209 A | 6/1965 | Friedman |
| 3,280,613 A | 10/1966 | Schrom |
| 3,292,218 A | 12/1966 | Kozma, Jr. |
| 3,344,848 A | 10/1967 | Hall et al. |
| 3,381,515 A | 5/1968 | Orloff |
| 3,534,802 A | 10/1970 | Carr |
| 3,554,272 A | 1/1971 | Lauth |
| 3,709,459 A | 1/1973 | Bushrod |
| 3,736,642 A | 6/1973 | Miller et al. |
| 3,744,112 A | 7/1973 | Lindenberg |
| 3,793,086 A | 2/1974 | Badger |
| 3,808,663 A | 5/1974 | McLane |
| 3,835,686 A | 9/1974 | Lawson et al. |
| 3,842,646 A | 10/1974 | Kuhn |
| 3,945,097 A | 3/1976 | Daniels, Jr. et al. |
| 3,945,428 A | 3/1976 | Yanagisawa et al. |
| 3,947,936 A | 4/1976 | Wheadon |
| 3,992,759 A | 11/1976 | Farmer |
| 4,034,793 A | 7/1977 | Okura et al. |
| 4,049,040 A | 9/1977 | Lynch |
| 4,062,613 A | 12/1977 | Tritenne |
| 4,079,911 A | 3/1978 | Wirtz et al. |
| 4,083,478 A | 4/1978 | McLane |
| 4,100,674 A | 7/1978 | Tiegel |
| 4,146,771 A | 3/1979 | Tiegel |
| 4,160,309 A | 7/1979 | Scholle |
| 4,168,618 A * | 9/1979 | Saier ................ B21C 37/207 165/184 |
| 4,177,551 A | 12/1979 | Johnson et al. |
| 4,212,934 A | 7/1980 | Salamon |
| 4,257,250 A | 3/1981 | Vanderhorst et al. |
| 4,266,597 A | 5/1981 | Eberle |
| 4,284,122 A | 8/1981 | Oxenreider et al. |
| 4,291,568 A | 9/1981 | Stifano |
| 4,352,283 A | 10/1982 | Bailey |
| 4,362,043 A | 12/1982 | Hanson |
| 4,377,197 A | 3/1983 | Oxenreider et al. |
| 4,394,059 A | 7/1983 | Reynolds |
| 4,406,146 A | 9/1983 | Suzuki |
| 4,416,141 A | 11/1983 | Nipped |
| 4,422,236 A | 12/1983 | Ware, Jr. et al. |
| 4,423,617 A | 1/1984 | Nippert |
| 4,430,396 A | 2/1984 | Hayes, Jr. |
| 4,495,260 A | 1/1985 | Hardigg et al. |
| 4,497,359 A | 2/1985 | Suzuki et al. |
| 4,505,307 A | 3/1985 | Uchida |
| 4,574,005 A | 3/1986 | Cobbs, Jr. |
| 4,580,431 A | 4/1986 | Oku et al. |
| 4,592,405 A | 6/1986 | Allen |
| 4,610,581 A | 9/1986 | Heinlein |
| 4,614,630 A | 9/1986 | Pluim, Jr. |
| 4,662,205 A | 5/1987 | Ratte |
| 4,683,647 A | 8/1987 | Brecht et al. |
| 4,744,540 A | 5/1988 | Salamon et al. |
| 4,753,283 A | 6/1988 | Nakano |
| 4,775,604 A | 10/1988 | Dougherty et al. |
| 4,776,197 A | 10/1988 | Scott |
| 4,779,443 A | 10/1988 | Hoshi |
| 4,779,665 A | 10/1988 | Ouimet |
| 4,852,634 A | 8/1989 | Kawai et al. |
| 4,859,547 A | 8/1989 | Adams et al. |
| 4,874,032 A | 10/1989 | Hatamura |
| 4,879,191 A | 11/1989 | Sindorf |
| 4,938,276 A | 7/1990 | Noguchi et al. |
| 4,945,749 A | 8/1990 | Walker et al. |
| 4,967,827 A | 11/1990 | Campbell |
| 5,016,460 A | 5/1991 | England et al. |
| 5,048,590 A | 9/1991 | Carter |
| 5,072,772 A | 12/1991 | Haehne |
| 5,074,352 A | 12/1991 | Suzuki |
| 5,077,892 A | 1/1992 | Nugent |
| 5,079,967 A | 1/1992 | LaCava |
| 5,108,668 A | 4/1992 | Kallup |
| 5,125,450 A | 6/1992 | Kidd et al. |
| 5,143,141 A | 9/1992 | Frulla |
| 5,146,974 A | 9/1992 | Mayer et al. |
| 5,170,835 A | 12/1992 | Eberle et al. |
| 5,180,643 A | 1/1993 | Nedbal |
| 5,244,033 A | 9/1993 | Ueno |
| 5,273,845 A | 12/1993 | McHenry et al. |
| 5,290,646 A | 3/1994 | Asao et al. |
| 5,296,317 A | 3/1994 | Ratte et al. |
| 5,316,505 A | 5/1994 | Kipp |
| 5,326,655 A | 7/1994 | Mix et al. |
| 5,343,927 A | 9/1994 | Ivansson |
| 5,349,840 A | 9/1994 | Ratte et al. |
| 5,373,720 A | 12/1994 | Ratte et al. |
| 5,380,603 A | 1/1995 | Hooke |
| 5,415,219 A | 5/1995 | Wiedenmann et al. |
| 5,422,202 A | 6/1995 | Spiegelberg et al. |
| 5,445,907 A | 8/1995 | Ito et al. |
| 5,458,032 A | 10/1995 | Spiegelberg |
| 5,499,449 A | 3/1996 | Carter et al. |
| 5,511,605 A | 4/1996 | Iwamoto |
| 5,580,685 A | 12/1996 | Schenk |
| 5,584,730 A | 12/1996 | Tabata |
| 5,595,511 A | 1/1997 | Okada |
| 5,606,887 A | 3/1997 | Spiegelberg et al. |
| 5,623,984 A | 4/1997 | Nozaki et al. |
| 5,632,173 A | 5/1997 | Spiegelberg et al. |
| 5,655,400 A | 8/1997 | Spiegelberg et al. |
| 5,660,946 A | 8/1997 | Kump et al. |
| 5,663,015 A | 9/1997 | Hooke et al. |
| 5,671,797 A | 9/1997 | Nozaki et al. |
| 5,672,442 A | 9/1997 | Burnett |
| 5,686,202 A | 11/1997 | Hooke et al. |
| 5,704,119 A | 1/1998 | Ratte et al. |
| 5,709,967 A | 1/1998 | Larsen |
| 5,725,043 A | 3/1998 | Schaefer et al. |
| 5,730,203 A | 3/1998 | Mogensen |
| 5,746,267 A | 5/1998 | Yun et al. |
| 5,752,562 A | 5/1998 | Sparks |
| 5,758,711 A | 6/1998 | Ratte |
| 5,778,962 A | 7/1998 | Garza-Ondarza et al. |
| 5,785,110 A | 7/1998 | Guergov |
| 5,791,183 A | 8/1998 | Spiegelberg et al. |
| 5,814,421 A | 9/1998 | Spiegelberg et al. |
| 5,836,372 A | 11/1998 | Kono |
| 5,862,853 A | 1/1999 | Eliat |
| 5,887,641 A | 5/1999 | Iwamoto et al. |
| 5,908,065 A | 6/1999 | Chadwick |
| 5,924,471 A | 7/1999 | Lund et al. |
| 6,001,506 A | 12/1999 | Timmons et al. |
| 6,030,723 A | 2/2000 | Nagano et al. |
| 6,033,801 A | 3/2000 | Casais |
| 6,082,937 A | 7/2000 | Ratte |
| 6,123,142 A | 9/2000 | Ratte |
| 6,152,785 A | 11/2000 | Haller et al. |
| 6,155,889 A | 12/2000 | Scarla et al. |
| 6,183,905 B1 | 2/2001 | Ling |
| 6,202,733 B1 | 3/2001 | Ratte |
| 6,255,617 B1 | 7/2001 | Farmer et al. |
| 6,258,481 B1 | 7/2001 | Ross et al. |
| 6,267,171 B1 | 7/2001 | Onuki et al. |

(56) References Cited

U.S. PATENT DOCUMENTS

| | | |
|---|---|---|
| 6,363,996 B1 | 4/2002 | Ratte |
| 6,405,786 B1 | 6/2002 | Ratte |
| 6,499,530 B2 | 12/2002 | Ratte |
| 6,513,570 B2 | 2/2003 | Ratte |
| 6,564,853 B1 | 5/2003 | Ratte |
| 6,598,658 B2 | 7/2003 | Ratte |
| 6,613,163 B1 | 9/2003 | Pfeifenbring et al. |
| 6,644,084 B1 | 11/2003 | Spiegelberg |
| 6,684,935 B2 | 2/2004 | Ratte et al. |
| 6,701,998 B2 | 3/2004 | Ratte |
| 6,803,146 B2 | 10/2004 | Key et al. |
| 6,806,000 B2 | 10/2004 | Misra et al. |
| 6,830,490 B2 | 12/2004 | Murakami et al. |
| 6,864,015 B2 | 3/2005 | Peterson et al. |
| 6,866,087 B2 | 3/2005 | Ratte |
| 6,896,031 B2 | 5/2005 | Ratte |
| 6,902,095 B2 | 6/2005 | Ratte |
| 6,908,640 B2 | 6/2005 | Ratte et al. |
| 6,929,051 B2 | 8/2005 | Peterson et al. |
| 6,982,131 B1 | 1/2006 | Hamada et al. |
| 6,997,234 B2 | 2/2006 | Peterson |
| 7,021,101 B2 | 4/2006 | Spiegelberg |
| 7,070,441 B1 * | 7/2006 | Gregory ............. H01M 2/0237 429/182 |
| 7,074,516 B2 | 7/2006 | Davidson et al. |
| 7,163,763 B2 | 1/2007 | Spiegelberg et al. |
| 7,163,764 B2 | 1/2007 | Ratte |
| 7,246,650 B2 | 7/2007 | Peterson |
| 7,338,539 B2 * | 3/2008 | Ratte ...................... B22D 25/04 164/47 |
| 7,390,364 B2 | 6/2008 | Ratte et al. |
| 8,202,328 B2 | 6/2012 | Ratte et al. |
| 8,497,036 B2 | 7/2013 | Garin et al. |
| 8,512,891 B2 | 8/2013 | Ratte |
| 8,701,743 B2 | 4/2014 | Ratte et al. |
| 8,802,282 B2 | 8/2014 | Garin et al. |
| 9,034,508 B2 | 5/2015 | Ratte |
| 9,190,654 B2 | 11/2015 | Ratte et al. |
| 9,748,551 B2 | 8/2017 | Cain et al. |
| 2001/0031394 A1 | 10/2001 | Hansen et al. |
| 2002/0002772 A1 | 1/2002 | Hirano et al. |
| 2002/0114994 A1 | 8/2002 | Yabuki et al. |
| 2003/0017391 A1 | 1/2003 | Peterson et al. |
| 2003/0017392 A1 | 1/2003 | Key et al. |
| 2003/0207172 A1 | 11/2003 | Misra et al. |
| 2003/0224248 A1 | 12/2003 | Spiegelberg et al. |
| 2005/0042509 A1 | 2/2005 | Key et al. |
| 2005/0084751 A1 | 4/2005 | Ratte |
| 2005/0147881 A1 | 7/2005 | Ratte et al. |
| 2005/0147882 A1 | 7/2005 | Ratte et al. |
| 2005/0153202 A1 | 7/2005 | Ratte |
| 2005/0155737 A1 | 7/2005 | Ratte |
| 2005/0238955 A1 | 10/2005 | Hooke et al. |
| 2006/0068279 A1 | 3/2006 | Spiegelberg et al. |
| 2006/0127693 A1 | 6/2006 | Peslerbe et al. |
| 2006/0162417 A1 | 7/2006 | Spiegelberg |
| 2008/0038633 A1 | 2/2008 | Ratte |
| 2009/0047574 A1 | 2/2009 | Hellmann |
| 2009/0229781 A1 | 9/2009 | Ratte |
| 2009/0246618 A1 | 10/2009 | Dirks |
| 2010/0116455 A1 | 5/2010 | Ratte |
| 2010/0291435 A1 | 11/2010 | Garin et al. |
| 2011/0045336 A1 | 2/2011 | Ratte et al. |
| 2011/0174459 A1 | 7/2011 | Garin et al. |
| 2011/0250493 A1 | 10/2011 | Balzan et al. |
| 2011/0262806 A1 | 10/2011 | Balzan et al. |
| 2014/0083642 A1 | 3/2014 | Ratte |
| 2014/0201981 A1 | 7/2014 | Ratte |
| 2014/0259646 A1 | 9/2014 | Cain |
| 2014/0322594 A1 | 10/2014 | Garin et al. |
| 2016/0126527 A1 | 5/2016 | Ratte et al. |

FOREIGN PATENT DOCUMENTS

| | | |
|---|---|---|
| CA | 2459031 | 3/1994 |
| CA | 2558525 | 4/2007 |
| CH | 321596 | 5/1957 |
| CH | 371154 | 8/1963 |
| DE | 523104 | 4/1931 |
| DE | 2645977 | 4/1978 |
| DE | 3230628 | 12/1983 |
| DE | 3401354 | 7/1985 |
| DE | 3502675 | 7/1986 |
| DE | 3942175 | 6/1991 |
| DE | 4127956 | 2/1993 |
| DE | 1146149 | 6/1994 |
| DE | 4241393 | 7/1994 |
| DE | 19635075 | 3/1998 |
| EP | 0040951 | 12/1981 |
| EP | 0117213 | 8/1984 |
| EP | 0244683 | 11/1987 |
| EP | 0261311 | 3/1988 |
| EP | 0319128 | 6/1989 |
| EP | 0344042 | 11/1989 |
| EP | 0448792 | 10/1991 |
| EP | 0559920 | 9/1993 |
| EP | 0590284 | 4/1994 |
| EP | 0601268 | 6/1994 |
| EP | 0809327 | 11/1997 |
| EP | 0878856 | 11/1998 |
| EP | 1291940 | 3/2003 |
| EP | 1700354 | 9/2006 |
| ES | 2097388 | 4/1997 |
| FR | 2504424 | 10/1982 |
| GB | 297904 | 10/1928 |
| GB | 386159 | 1/1933 |
| GB | 801628 | 9/1958 |
| GB | 1236495 | 6/1971 |
| GB | 1245255 | 9/1971 |
| GB | 1257963 | 12/1971 |
| GB | 1352882 | 5/1974 |
| GB | 2141654 | 1/1985 |
| GB | 2315695 | 2/1998 |
| JP | 55057259 | 4/1980 |
| JP | 56159054 | 12/1981 |
| JP | 56165359 | 12/1981 |
| JP | 58209861 | 12/1983 |
| JP | 59029357 | 2/1984 |
| JP | 61008846 | 1/1986 |
| JP | 61096660 | 5/1986 |
| JP | 61189860 | 8/1986 |
| JP | 1124954 | 5/1989 |
| JP | 1239762 | 9/1989 |
| JP | 1243369 | 9/1989 |
| JP | 2155557 | 6/1990 |
| JP | 2234347 | 9/1990 |
| JP | 2247036 | 10/1990 |
| JP | 3049152 | 3/1991 |
| JP | 3263756 | 11/1991 |
| JP | 4135042 | 5/1992 |
| JP | 4206459 | 7/1992 |
| JP | 4223047 | 8/1992 |
| JP | 5283057 | 10/1993 |
| JP | 5325940 | 12/1993 |
| JP | 6015402 | 1/1994 |
| JP | 6020663 | 1/1994 |
| JP | 6196136 | 7/1994 |
| JP | 6223812 | 8/1994 |
| JP | 7211308 | 8/1995 |
| JP | 7211309 | 8/1995 |
| JP | 7235286 | 9/1995 |
| JP | 9045309 | 2/1997 |
| JP | 9130460 | 5/1997 |
| JP | 9167610 | 6/1997 |
| JP | 9237615 | 9/1997 |
| JP | 9312151 | 12/1997 |
| JP | 9320630 | 12/1997 |
| JP | 10116602 | 5/1998 |
| JP | 10144289 | 5/1998 |
| JP | 8171897 | 7/1998 |
| JP | 10208714 | 8/1998 |

(56) References Cited

FOREIGN PATENT DOCUMENTS

| | | |
|---|---|---|
| JP | 8273656 | 10/1998 |
| JP | 11045698 | 2/1999 |
| JP | 11045699 | 2/1999 |
| JP | 11135102 | 5/1999 |
| JP | 11176415 | 7/1999 |
| JP | 2000021367 | 1/2000 |
| JP | 2000164199 | 6/2000 |
| JP | 2001006655 | 1/2001 |
| JP | 2001307714 | 2/2001 |
| JP | 2001256955 | 9/2001 |
| JP | 2002025536 | 1/2002 |
| JP | 2002050327 | 2/2002 |
| JP | 2002175795 | 6/2002 |
| JP | 2002270150 | 9/2002 |
| JP | 2003007281 | 1/2003 |
| JP | 2003242946 | 8/2003 |
| JP | 2003317677 | 11/2003 |
| JP | 2003317698 | 11/2003 |
| JP | 2003346777 | 12/2003 |
| JP | 2003346778 | 12/2003 |
| JP | 2004039401 | 2/2004 |
| JP | 2004228013 | 8/2004 |
| JP | 2004228046 | 8/2004 |
| JP | 2004235050 | 8/2004 |
| JP | 2004281145 | 10/2004 |
| JP | 2005078856 | 3/2005 |
| JP | 2005116243 | 4/2005 |
| JP | 2005116387 | 4/2005 |
| JP | 2005142009 | 6/2005 |
| JP | 2006331784 | 12/2006 |
| JP | 2007157611 | 6/2007 |
| KR | 20030044813 | 6/2003 |
| SU | 688279 | 9/1979 |
| WO | WO9402272 | 2/1994 |
| WO | WO9907029 | 2/1999 |
| WO | WO2005067513 | 7/2005 |
| WO | WO2005119813 | 12/2005 |
| WO | WO2008032348 | 3/2008 |
| WO | WO2009142621 | 11/2009 |
| WO | WO2010033239 | 3/2010 |
| WO | WO2010127289 | 11/2010 |

OTHER PUBLICATIONS

Gould Drawing No. 8RD5538, "Cold Forged Positive Lead Terminal Bushing for Plastic Covers", Gould Auto. Div., St. Paul, Minn., May 3, 1974.

Gould Drawing No. 8RD5539, "Cold Forged Negative Lead Terminal Bushing for Plastic Covers", Gould Auto. Div., St. Paul, Minn., May 3, 1974.

Heller, Machine translation of EP 0601268—May 1993, EPO, 2 pages.

HPM Corporation. HPM Tech Data-Thixomolding. Feb. 1992, 1 page, place of publication unknown.

HPM, Thixomolding Utilizes Injection Molding . . . Date unknown, 2 page advertisement, place of publication unknown.

Lindberg Corporation. Hot Lines. Mar. 1993, vol. III, Issue 2, pp. 1-2, place of publication unknown. Accepted and cited on U.S. Pat. No. 5,758,711.

Lindberg Corporation. Hot Lines. Significant Developments from the Engineered Products Group: Equipment News. Date unknown, Issue 3, 3 pages, place of publication unknown. Accepted and cited on U.S. Pat. No. 5,758,711.

Lindberg Corporation. Press Release: Thixomolding Processes Establishes Production Benchmarks, 1993, 5 pages, Illnois.

Non-Final Office Action U.S. Appl. No. 13/539,159, dated Apr. 3, 2013, 40 pages.

Notice of Allowance in U.S. Appl. No. 13/539,159; dated Apr. 27, 2017, 9 pages.

Supplemental Notice of Allowance in U.S. Appl. No. 13/539,159; dated Jul. 26, 2017, 2 pages.

Non-Final Office Action in U.S. Appl. No. 13/539,159; dated Jan. 12, 2017, 29 pages.

* cited by examiner

BATTERY PARTS HAVING RETAINING AND SEALING FEATURES AND ASSOCIATED METHODS OF MANUFACTURE AND USE

CROSS-REFERENCE TO RELATED APPLICATION(S) INCORPORATED BY REFERENCE

The present application is a divisional of U.S. patent application Ser. No. 13/539,159, filed Jun. 29, 2012, now U.S. Pat. No. 9,748,551, which claims priority to U.S. Provisional Patent Application No. 61/502,641, filed Jun. 29, 2011, and titled "BATTERY PARTS HAVING RETAINING AND SEALING FEATURES AND ASSOCIATED METHODS OF MANUFACTURE AND USE", both of which are incorporated herein by reference in their entirety.

TECHNICAL FIELD

The following disclosure relates generally to battery parts and, more particularly, to battery terminals, battery terminal bushings, and the like.

BACKGROUND

Battery terminals are typically cold formed or die cast from lead or lead alloys. In a conventional battery, the terminals protrude from a casing or container which carries electrolyte. The container is typically formed from a moldable thermoplastic resin, such as polypropylene. During manufacture of the container, the resin flows around the base of the terminals so that the resin will secure the terminals in place once it hardens. After a terminal has been secured, a lead anode can be inserted into a central hole in the terminal and melted to fill the hole and form a mechanical and electrical connection to a battery grid positioned within the container.

Battery terminals can include annular acid rings that extend around the base of the terminal to provide an extended interface between the base of the terminal and the adjacent container material. This interface can provide a tortuous path or "labyrinth seal" that inhibits or prevents electrolyte from escaping the battery container. Various types of terminal seals, and methods for making such seals are disclosed in U.S. Pat. Nos. 7,338,539 and 8,202,328, and U.S. patent application Ser. Nos. 11/011,362, and 12/533,413, now U.S. Pat. No. 8,701,743, all of which are incorporated into the present application in their entireties by reference. Conventional seals can be compromised if the container material shrinks during hardening or otherwise pulls away from the base of the terminal over time. There is accordingly a need for a battery terminal that can maintain an adequate seal with a battery container under extended use.

DETAILED DESCRIPTION

The following disclosure describes various embodiments of battery parts, such as battery terminals or bushings and the like, and associated methods of manufacture and use. In one embodiment, the battery part includes several sealing portions that encircle a base portion of the battery part. Plastic material can be molded around the base portion to form a battery container that can contain electrolyte or other fluid. To prevent the battery fluid from leaking from the container, the sealing portions create an indirect, tortuous path. In some embodiments, the sealing portions have lips that flare outwardly from the base portion. The adjacent lips of adjacent sealing portions can overlap one another to prevent the molded plastic material from shrinking and pulling away from the battery part. The adjacent sealing portions can have different radial dimensions to avoid interference between adjacent lips.

In one embodiment, a battery terminal configured in accordance with the present disclosure includes a body having a base portion that is configured to be embedded in battery container material when the corresponding battery container is formed. The base portion can include undercut sealing portions, each having a root and a lip. The lip can flare outwardly from the root to define an undercut between the root and the lip of the sealing portion. In some embodiments, the battery terminal can include adjacent sealing portions having opposing undercuts defined by overlapping lips of the adjacent sealing portions.

In some embodiments, the present disclosure is directed to a battery part and methods of manufacturing such a part. The battery part can include a lug portion, a base portion, and a flange. The flange can extend radially from the battery part between the lug portion and the base portion. The battery part can also include a plurality of sealing portions extending generally radially outwardly from the base portion. The sealing portions can include lips that flare outwardly from the base portion, forming an undercut between the lip and the base portion. Moreover, a lip of one sealing portion can overlap a lip of an adjacent sealing portion, so that when viewed from the side, one lip appears to cover the other lip.

In some embodiments, the battery part can include a lug portion, a base portion, a first sealing portion extending radially outward from the base portion, and a second sealing portion extending radially outward from the base portion adjacent to the first sealing portion. The battery part can further include a first lip extending from the first sealing portion, and a second lip extending from the second sealing portion. The first lip flares outwardly toward the second sealing portion and overlaps at least a portion of the second lip with a space between the first lip and the second lip.

In further embodiments, the battery parts can include a first sealing portion extending from a base portion of the battery terminal and having a first root and a first lip, and a second sealing portion extending from the base portion adjacent the first sealing portion and having a second root and a second lip. The first root of the first sealing portion is spaced apart from the second root of the second sealing portion by a first distance, and the first lip of the first sealing portion is spaced apart from the second lip of the second sealing portion by a second distance that is less than the first distance. In this embodiment, the first and second lips can at least partially overlap with a small space between the lips.

Certain details are set forth in the following description and in FIGS. 1A-2 to provide a thorough understanding of various embodiments of the disclosure. Other details describing well-known structures and systems often associated with battery parts (e.g., lead and/or lead alloy battery parts, moldable battery containers, etc.), and methods for forming such parts (e.g., forming, casting, injection molding, etc.), as well as other battery parts and assemblies, are not set forth in the following disclosure to avoid unnecessarily obscuring the description of the various embodiments of the disclosure.

Many of the details, dimensions, angles and/or other portions shown in the Figures are merely illustrative of particular embodiments of the disclosure. Accordingly, other embodiments can have other details, dimensions, angles and/or portions without departing from the scope of the present disclosure. In addition, further embodiments of the disclosure may be practiced without several of the details described below, while still other embodiments of the disclosure may be practiced with additional details and/or portions.

In the Figures, identical reference numbers identify identical or at least generally similar elements. To facilitate the discussion of any particular element, the most significant digit or digits of any reference number refers to the Figure in which that element is first introduced. For example, element 110 is first introduced and discussed with reference to FIG. 1.

Figure 1A:
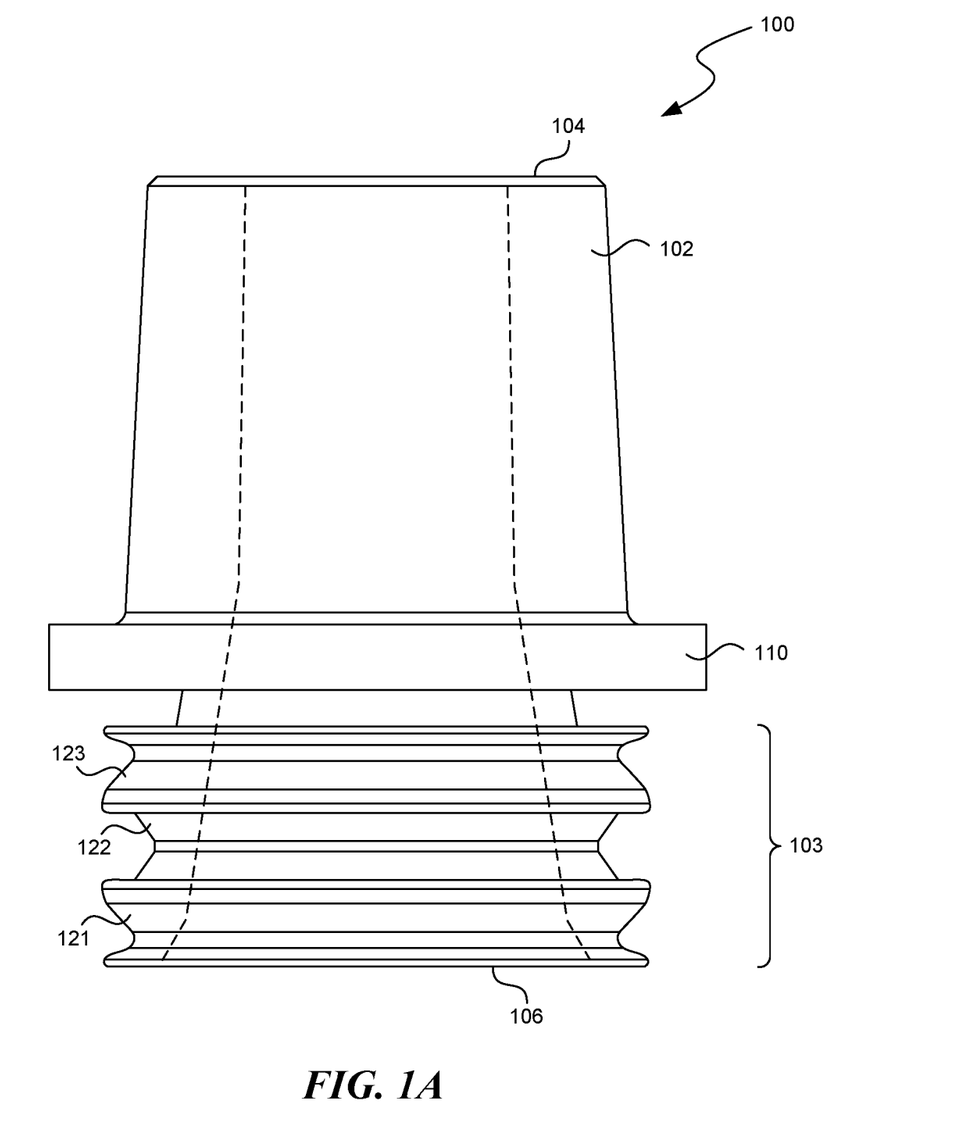
FIG. 1A is a front view and FIG. 1B is a cross-sectional front view of a battery part configured in accordance with an embodiment of the present disclosure.
Figure 1B:
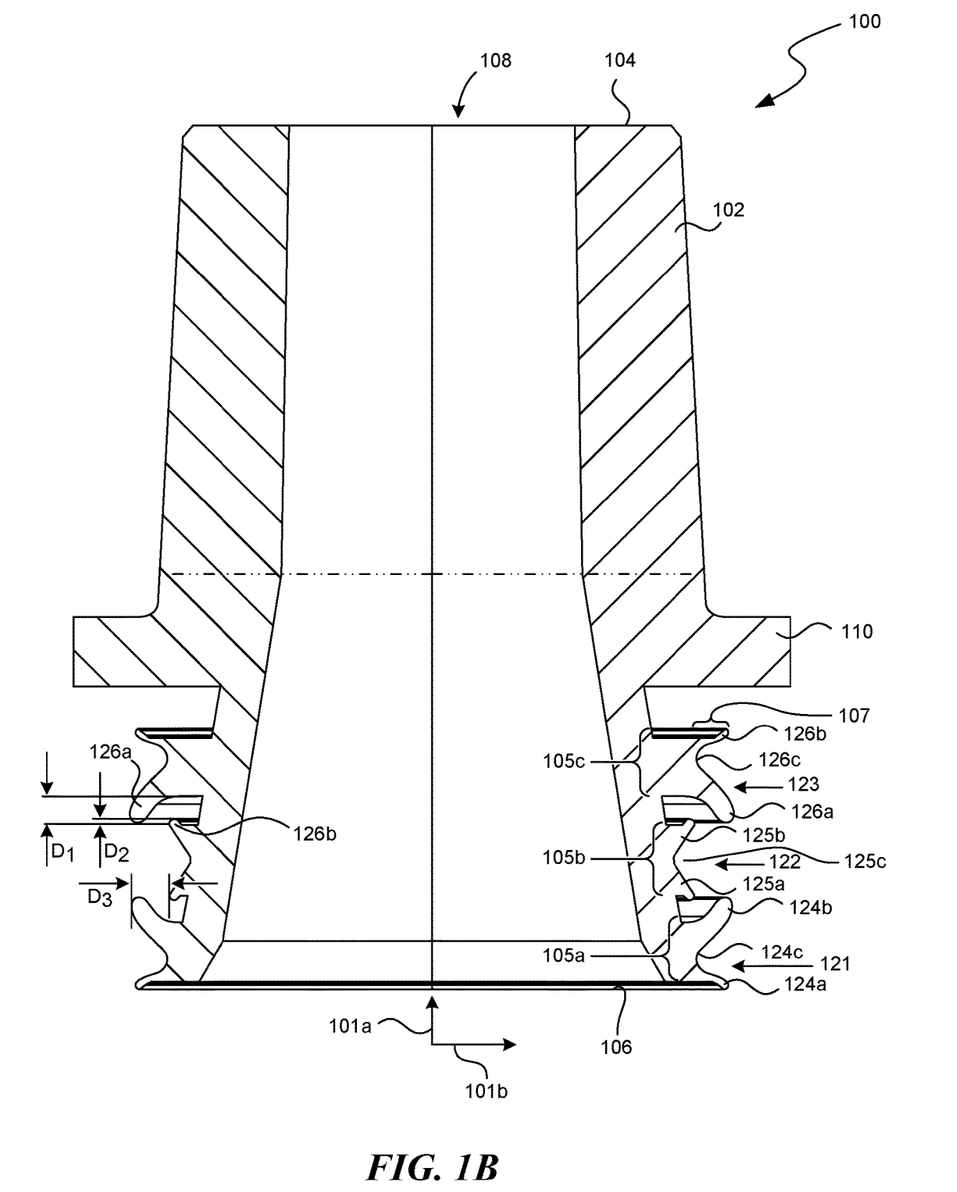

FIG. 1A is a front view and FIG. 1B is a cross-sectional front view of a battery part 100 configured in accordance with an embodiment of the disclosure. Referring to FIGS. 1A and 1B together, in the illustrated embodiment the battery part 100 is a battery terminal or terminal bushing. In other embodiments, the battery part 100 can be other parts (e.g., other lead parts) configured to seal plastic and other containers. The battery part 100 can be formed from lead, lead alloy, and/or other suitable materials by forming (e.g., cold-forming, cold-forming with a segmented mold, hot-forming, roll-forming, stamping, etc.), casting (e.g., die casting), forging, machining, and/or other suitable methods known in the art.

In one aspect of this embodiment, the battery part 100 includes a projecting portion or lug portion 102 that extends from a base portion 103. The battery part 100 can also include a passage or through-hole 108 extending through the battery part 100 from a first end portion 104 to a second end portion 106. In the illustrated embodiment, the battery part 100 is aligned with a longitudinal axis 101a and a transverse axis 101b. The present embodiment refers to axial dimensions extending generally parallel to the longitudinal axis 101a, and radial dimensions extending generally parallel to the transverse axis 101b (i.e., perpendicular to the axis 101a). Terms such as upward, downward, inward, and outward may be used herein to refer to components of the battery part 100 as depicted in the Figures, although in use the battery part 100 may be oriented in any suitable direction.

The battery part 100 can include a flange 110 at an approximate midpoint of the battery part 100 near the base of the lug portion 102. The base portion 103 can include a plurality of sealing portions that extend generally radially outward from the base portion 103. In some embodiments, for example, the base portion 103 can include three sealing portions: a first sealing portion 121, a second sealing portion 122, and a third sealing portion 123. More or fewer than three sealing portions 121-123 can be used in other embodiments. Each of the sealing portions 121-123 can include similar features. For example, the first sealing portion 121 can have a root 105a, a first lip 124a, a second lip 124b, and a recess 124c between the first lip 124a and the second lip 124b. The second sealing portion 122 can similarly have a root 105b, a first lip 125a, a second lip 125b, and a recess 125c. The third sealing portion 123 can also have a root 105c, a first lip 126a, a second lip 126b, and a recess 126c.

As described in more detail below, a battery container (shown in FIG. 2) can be formed around the sealing portions 121-123, and at least a portion of the flange 110. The profile of the sealing portions 121-123 forms a tortuous path that prevents fluids from leaking from the battery container between the battery part 100 and the container and restrains the container material from pulling away from the battery part 100 during formation and in use.

In some embodiments, the first lip 126a of the third sealing portion 123 can extend axially downwardly from a sidewall of the root 105c by a distance $D_1$. The second lip 125b of the second sealing portion 122 can extend axially upwardly from a sidewall of the root 105b, and can reach beyond the lower extent of the first lip 126a of the third sealing portion 123 by an overlap distance $D_2$. In the illustrated embodiment, the overlap distance D2 defines the axial overlap between adjacent lips of adjacent sealing portions. To accommodate this overlap, adjacent sealing portions can be radially offset, for example by a distance $D_3$.

In some embodiments, the third sealing portion 123 and the first sealing portion 121 can have substantially similar dimensions, but the third sealing portion 123 can be inverted relative to the first sealing portion 121. For example, as shown in FIG. 1B, the first lip 126a is generally similar to the second lip 124b of the first sealing portion 121. The second lip 126b can be generally similar to the first lip 124a of the first sealing portion 121. In some embodiments, the second sealing portion 122 is symmetrical about a transverse center plane, and the first lip 125a can be substantially similar to the second lip 125b.

In some embodiments, the lips of the adjacent sealing portions 121-123 can overlap to define a double-undercut. For example, the second lip 124b of the first sealing portion 121 extends upward to reach an axial position that is higher than the tip of the first lip 125a of the second sealing portion 122 (the lowest point on the first lip 125a). To avoid interference between the lips 125a and 124b, the second sealing portion 122 can be radially offset from the first sealing portion 121 and the third sealing portion 123. Each pair of adjacent sealing portions can have this double-undercut feature. In the embodiments shown in FIGS. 1 and 2, the first sealing portion 121 and the second sealing portion 122 have a double-undercut between them, and the second sealing portion 122 and the third sealing portion 123 have a double undercut between them. FIG. 1 illustrates this overlapping feature.

In some embodiments, the axial overlap between adjacent lips can be from about 0.006 to 0.010 inch, or about 0.008 inch, and the radial overlap can be from about 0.1 inch to about 0.025 inch, or about 0.03 inch. Other dimensions are possible and can be varied depending on circumstances and design choices. The overlap between adjacent lips of adjacent sealing portions 121-123 creates a tortuous path that inhibits leakage of a fluid out from the battery container. The battery container can be made of a plastic material which is molded around the sealing portions 121-123 in a suitable manner known in the art. During formation and even during use, the plastic of the battery container may tend to pull away from the base portion 103. The double-undercut feature can resist this tendency because the plastic of the container that fills the undercut region is trapped between the adjacent lips of the adjacent sealing portions 121-123. This further inhibits leakage from the battery container through the interface between the battery part 100 and the battery container.

The sealing portions 121-123 can be formed in a variety of suitable methods. In one embodiment, the sealing portions are formed (e.g., cast or molded) with the lips extending radially outwardly from the base portion 103 and are pressed between two or more convex or flat surfaces that press against the lips and a portion of the recesses of the sealing portions 121-123 and bend the lips upwardly and downwardly away from the recesses, giving the flared shape shown in FIGS. 1A and 1B. In other embodiments, the battery part 100 and the sealing portions can be rolled against a stationary or rolling die which can form the root and the lips of the sealing portions to have the overlapping characteristic as well. Several other techniques can be used to create the sealing portions 121-123. For example, many suitable techniques are described in U.S. Pat. No. 7,338,539, which is incorporated herein by reference in its entirety.

Figure 2:
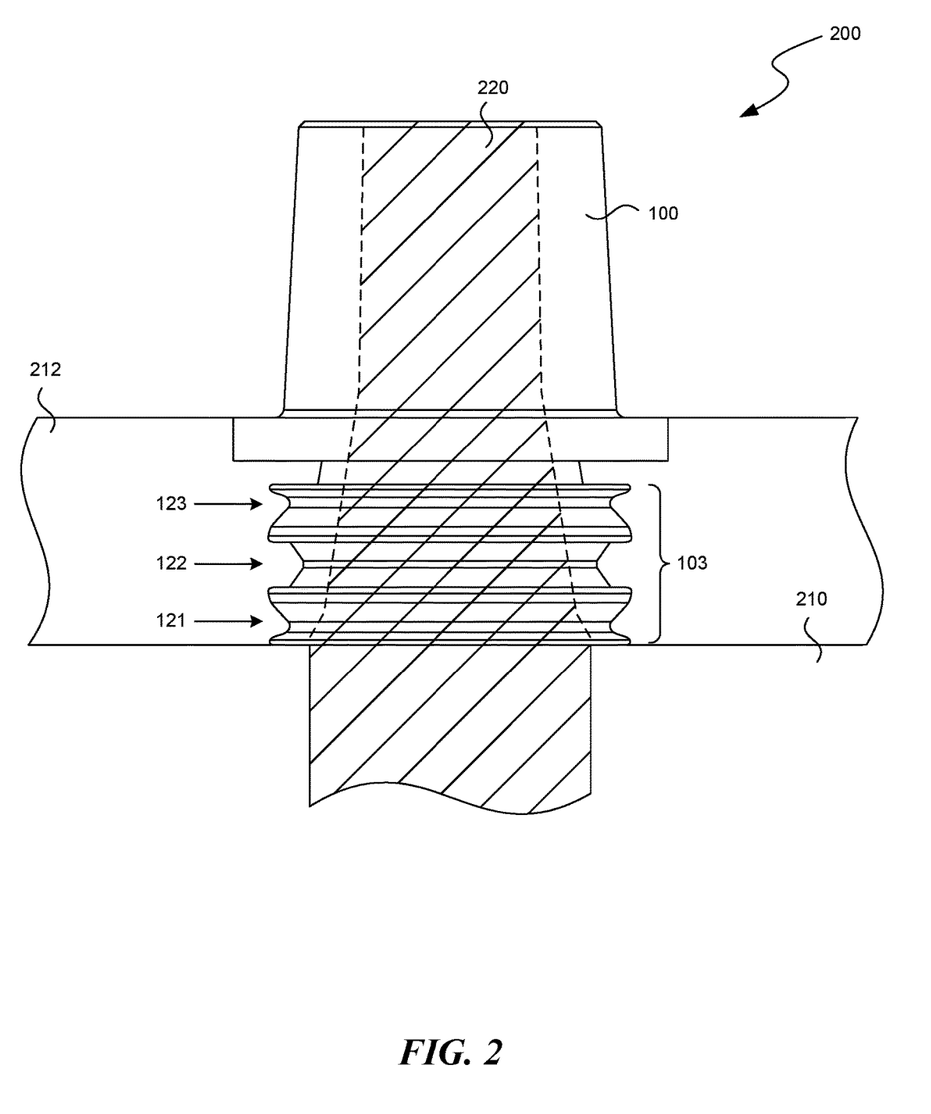
FIG. 2 is a front view of a battery assembly including a battery part configured in accordance with an embodiment of the present disclosure.

FIG. 2 is a cross-sectional view of a battery assembly 200 including the battery part 100 of FIGS. 1A and 1B configured in accordance with an embodiment of the present disclosure. The assembly 200 includes the battery part 100 attached to a battery casing or container 210 so that the lug portion 102 is exposed and accessible. The battery container 210 can be formed from a moldable material 212, such as polypropylene, polyethylene, other plastics, thermoplastic resins, and/or other suitable materials known in the art. During manufacture of the battery assembly 200, molten container material 212 can be flowed around the base portion 103 and sealing portions 121-123 of the battery part 100 so that the flange 110 is at least partially embedded in the container material 212, and the sealing portions 121-123 are embedded within the container material 212. The container material 212 flows between adjacent lips of adjacent sealing portions 121-123 as described above to fill the double-undercut regions and create a seal that can prevent or at least inhibit liquid (e.g., electrolyte, acid, water, etc.) from escaping the battery container 210 even if the container material shrinks.

The battery assembly 200 can also include a lead anode or conductor 220 that is mechanically and electrically connected to the battery part 100. More specifically, the conductor 220 fills the through-hole 108 and can be connected to a battery grid (not shown) positioned within the battery container 210. More details of the connection mechanism between the conductor 220, battery part 100, and battery grid are given in U.S. patent application Ser. No. 12/771,714, now U.S. Pat. No. 8,497,036, which is also incorporated herein by reference in its entirety.

From the foregoing, it will be appreciated that specific embodiments of the disclosure have been described herein for purposes of illustration, but that various modifications may be made without deviating from the spirit and scope of the various embodiments of the disclosure. For example, although many of the Figures described above illustrate battery parts having cylindrical portions (e.g., cylindrical lug portions, base portions, through-holes, etc.), in other battery parts configured in accordance with the present disclosure these portions can have one or more flat sides and/or other non-cylindrical surfaces. Further, while various advantages associated with certain embodiments of the disclosure have been described above in the context of those embodiments, other embodiments may also exhibit such advantages, and not all embodiments need necessarily exhibit such advantages to fall within the scope of the disclosure. Accordingly, the disclosure is not limited, except as by the appended claims.

The invention claimed is:

1. A method of making a battery part comprising:
   forming a battery part having a first sealing portion and at least a second sealing portion extending around an exterior portion thereof, wherein the first sealing portion and the second sealing portion include a first lip and second lip, respectively, extending therefrom;
   bending the first lip in a first direction; and
   bending the second lip in a second direction, generally opposite to the first direction, wherein bending the second lip defines an undercut region between the second lip and the exterior portion of the battery part, and wherein the first lip is at least partially disposed within the undercut region.

2. The method of claim 1 wherein bending the first and second lips includes:
   positioning the battery part between a first forming member and a second forming member; and
   pressing the first forming member and the second forming member against the battery part to bend the first lip and the second lip.

3. The method of claim 2 wherein pressing the first and second forming members against the battery part bends the first lip and the second lip toward each other.

4. The method of claim 1 wherein forming the battery part includes casting the battery part.

5. The method of claim 1 wherein the battery part includes a longitudinal axis, wherein the first and second directions are generally parallel to the longitudinal axis, wherein the first and second sealing portion is spaced apart from the first sealing portion in the first direction, wherein the second lip at least partially overlaps the first lip in the second direction, and wherein the first and second lips are spaced apart from each other in a third direction generally perpendicular to the longitudinal axis.

6. The method of claim 1 wherein bending the first and second lips includes:
   rotating the battery part; and
   while rotating the battery part, contacting the first and second lips with a forming member.

7. The method of claim 6 wherein the forming member is rotatable, and wherein contacting the first and second lips with the forming member includes radially pressing against the first and second lips with the forming member.

8. A method of making a battery part, comprising:
   forming a battery part having—
      a base portion;
      a first sealing portion having a first lip extending radially outward from the base portion; and
      a second sealing portion axially spaced apart from the first sealing portion and having a second lip extending radially outward from the base portion;
   flaring the first lip in a first direction; and
   flaring the second lip in a second direction, generally opposite the first direction so that the second lip axially overlaps the first lip.

9. The method of claim 8 wherein, after flaring the first and second lips, the first lip is radially offset from the second lip.

10. The method of claim 8 wherein flaring the first and second lips includes flaring the first and second lips substantially simultaneously.

11. The method of claim 8, further comprising forming a through-hole extending through the battery part in the axial direction.

12. The method of claim 8 wherein the battery part further includes a third sealing portion having a third lip extending radially outward from the base portion, wherein the first sealing portion is axially disposed between the second and third sealing portions and has a fourth lip extending radially outward from the base portion, and wherein the method further comprises:

flaring the fourth lip in generally the second direction; and
flaring the third lip in generally the first direction so that the third lip axially overlaps the fourth lip.

13. The method of claim 12 wherein the first sealing portion is radially offset relative to the second and third sealing portions.

14. The method of claim 12 wherein the second and third sealing portions have substantially similar dimensions, and wherein the second sealing portion is inverted relative to the third sealing portion.

15. The method of claim 12 wherein flaring the first, second, and third lips includes:

positioning the battery part between at least two forming members; and
pressing the forming members against the battery part to flare the first lip, the second lip, the third lip, and the fourth lip.

16. The method of claim 15 wherein pressing the forming members against the battery part flares (a) the first lip and the second lip toward each other, and (b) flares the third lip and the fourth lip toward each other.

17. The method of claim 12 wherein flaring the first, second, third, and fourth lips includes:

rolling at least one of the battery part and a die; and
engaging the battery part with the die.

18. A method of making a battery terminal, comprising casting a battery terminal having first and second annular acid rings extending around an exterior portion thereof;

pressing against the first annular acid ring to flare a first lip portion of the first annular acid ring outwardly from a first root portion of the first annular acid ring; and
pressing against the second annular acid ring to flare a second lip portion of the second annular acid ring outwardly from a second root portion of the second annular acid ring and toward the first lip portion wherein flaring the second lip portion defines an undercut region between the second lip portion and the exterior portion of the battery terminal, and wherein at least a portion of the first lip portion is disposed within the undercut region.

19. The method of claim 18 wherein the undercut region is a first undercut region, and wherein flaring the second lip portion defines a second undercut region between the second lip portion and the exterior portion of the battery terminal.

* * * * *